2,896,359

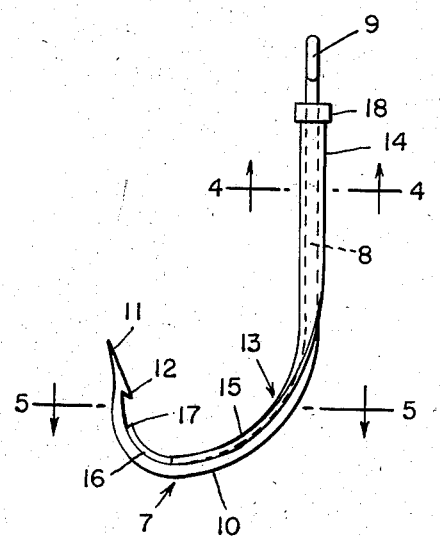
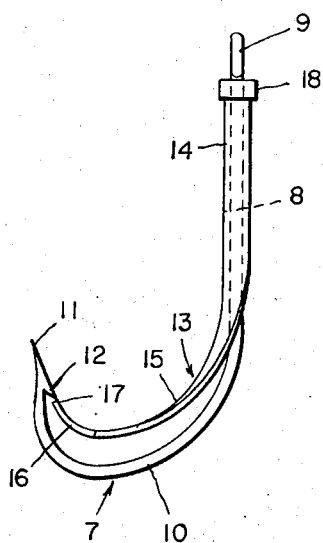
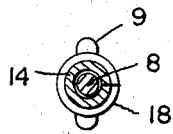
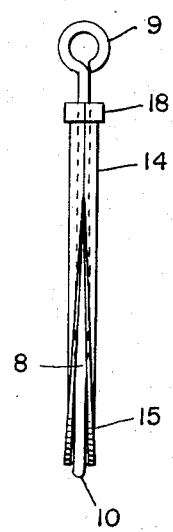
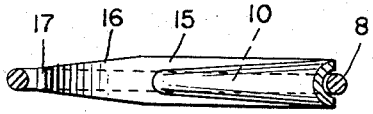
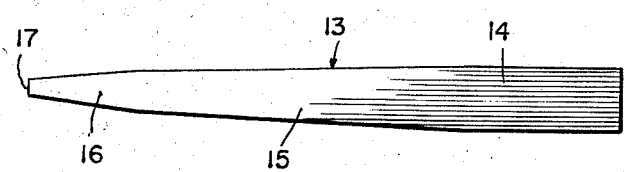
INVENTOR.
Camille Lanthier United States Patent Office 2,896,359
Patented July 28, 1959

FISHHOOK

Camille Lanthier, Faust, N.Y.

Application January 22, 1957, Serial No. 635,448

1 Claim. (Cl. 43—43.16)

This invention relates to a fish hook and more particularly to an improved guard for the hook barb, operative to facilitate the removal of the hook from a fish or from a person accidentally hooked thereby.

The barb of the conventional fish hook is designed to prevent the fish from slipping off the hook but, by the same token, renders the removal of the hook difficult. Numerous guard means have been employed for facilitating the removal of the hook from a fish or a person, such as disclosed in Patent Number 989,382 granted April 11, 1911, to J. J. Mueller, Patent Number 1,333,148 granted March 9, 1920, to A. A. Anderson and Patent Number 2,217,928 granted October 15, 1940, to L. Ward. However, these devices have not proven commercially practical since, inter alia, they require hooks of special construction and/or utilize multiple parts.

It is an object of this invention to provide an improved barb guard of simple and economical construction adapted for application to a conventional fish hook, the guard being movable into operative engagement with the hook barb to facilitate removal of the hook from a fish or from the fingers, etc. of a person accidentally hooked.

Another object is to provide a device of the character described formed from a single blank of material and slidably mounted on the hook, a portion of the guard being curvilinear for engagement with a complemental portion of the hook, when the guard is inoperative.

Other objects of the invention will be manifest from the following description of the present preferred form of the invention, taken in connection with the accompanying drawings, wherein:

Fig. 1 is a side elevational view of the device of the present invention, illustrating its application and showing the guard in inoperative position;

Fig. 2 is a similar view showing the guard in operative position;

Fig. 3 is a rear elevational view of the present invention, showing to advantage details of construction;

Fig. 4 is a sectional view taken along the lines 4—4 of Fig. 1, looking in the direction of the arrows;

Fig. 5 is a section view taken on the lines 5—5 of Fig. 1, looking in the direction of the arrows; and Fig. 6 is a plan view of a blank from which the present guard is formed.

Referring now in greater detail to the drawing, the numeral 7 generally designates a fish hook of conventional construction comprising a shank 8, one end of which is bent to form an eyelet 9. The free end of shank 8 is bent to form a bill 10 which terminates in a point 11, adjacent which point is a barb 12.

The guard of the present invention, indicated at 13, is preferably of flexible metallic construction and formed from a single blank of material illustrated in Fig. 6. The guard blank includes an upper or shank portion 14, of predetermined width, the side margins of which are parallel. The intermediate portion of the blank designated 15 tapers inwardly from portion 14 and comprises a substantial part of the guard blank. Portion 15 in turn, issues into a more sharply tapered section 16 which terminates in a blunt point 17.

As shown in Figs. 1 to 5, the guard blank is applied to hook 7 by bending portion 14 into tubular shape about hook shank 8 so that the parallel side margins thereof meet. The upper terminal of portion 14 is next bent back upon itself to form a collar 18. Tapered section 15 is bent transversely in the manner of portion 14 but by reason of its reduced width, extends only partly around the hook body (see Fig. 3). In addition to being bent transversely to complement the cross sectional contour of the fish hook, portion 15 is also bent longitudinally to conform to the curve of hook bill 10 and, in the inoperative position, lies in contiguous relationship with the inner face thereof. Section 16 is substantially flat and is also longitudinally bent to conform to the contour of bill 10.

In use, guard 13 is normally in the inoperative position shown in Fig. 1 with point 17 of the guard in spaced relation to barb 12. In this position, portions 15 and 16 are contiguous with bill 10, thereby permitting the hook to be baited without interference from the guard and without danger of the guard cutting the bait. When it is desired to move the guard, tubular portion 14 is slid upwardly on shank 8 until collar 18 abuts eye 9 and, since the guard moves as a unit, point 17 moves upwardly to engage barb 12. Referring to Fig. 2, it will be seen that this movement renders barb 12 inoperative.

With the device of the present invention, the hook can be removed from the fish without killing it while extracting the hook, so that undersized fish which have been caught may be released.

Various changes may be made within the scope of the claim hereto appended.

What I claim is:

In combination with a fish hook having a shank, a bill, a point and a barb, a one-piece barb guard of substantially the same shape as the fish hook including an upper tubular portion sleeved on the hook shank, an intermediate tapered section tapering longitudinally throughout its length, said tapered section being bent longitudinally to conform to the curvature of the hook bill and bent transversely to extend partly around said hook shank and lie in contiguous relationship with the inner face of the hook bill, when the guard is in inoperative position, and a terminal portion issuing from said tapered section, said barb guard being movable as a unit to bring said terminal portion thereof into engagement with the hook barb and thereby render the barb inoperative.

References Cited in the file of this patent

UNITED STATES PATENTS

| | | |
|---|---|---|
| 989,392 | Mueller | Apr. 11, 1911 |
| 1,333,148 | Anderson | Mar. 9, 1920 |
| 1,717,190 | Coleman | June 11, 1929 |